Sept. 17, 1940.  I. HECHENBLEIKNER ET AL  2,215,394
SULPHATE CONVERSION SYSTEM
Filed Sept. 16, 1932
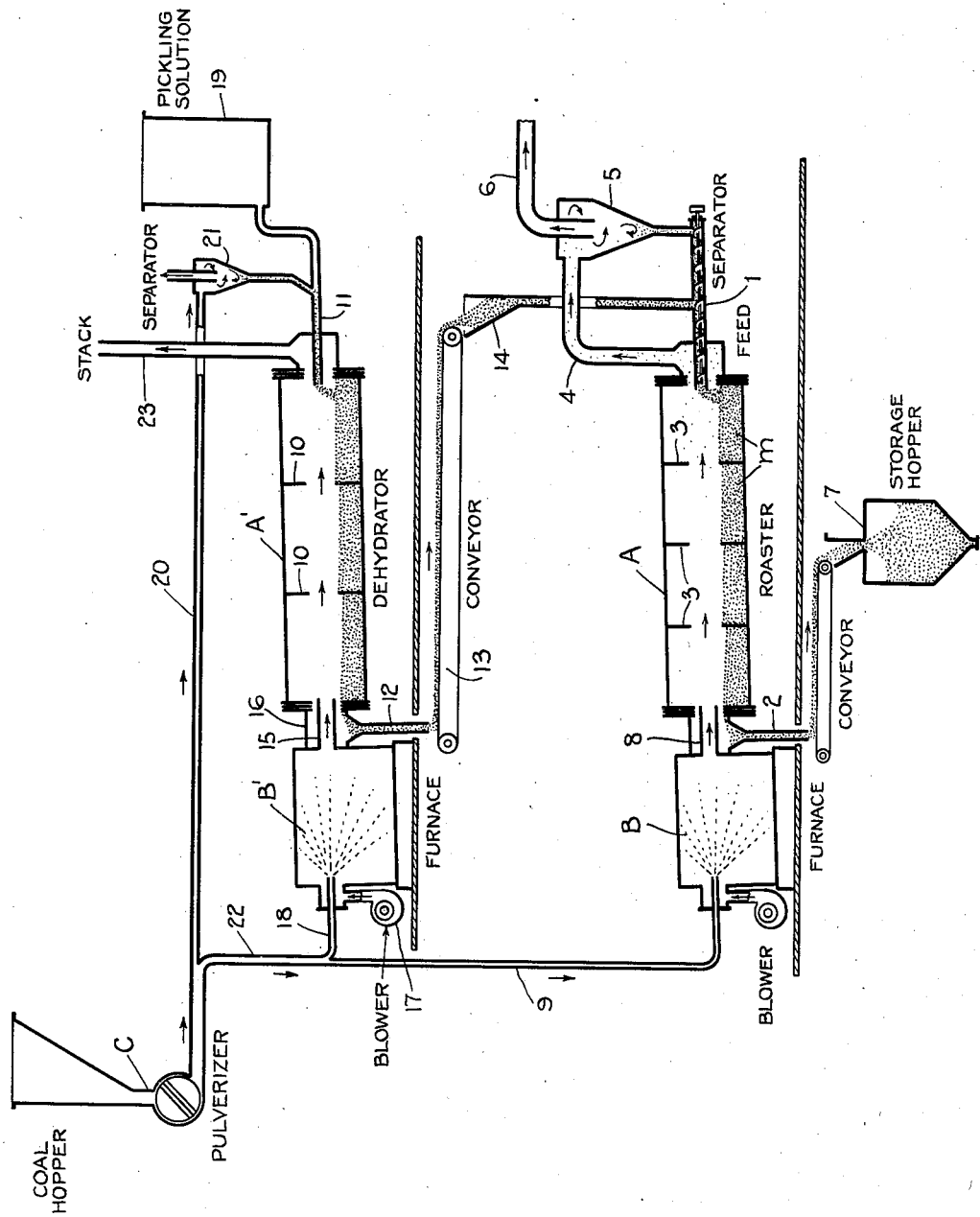
INVENTORS
INGENUIN HECHENBLEIKNER
NICOLAY TITLESTAD
BY
ATTORNEYS Patented Sept. 17, 1940

2,215,394

UNITED STATES PATENT OFFICE 2,215,394

SULPHATE CONVERSION SYSTEM

Ingenuin Hechenbleikner and Nicolay Titlestad, Charlotte, N. C., assignors to Chemical Construction Corporation, Charlotte, N. C., a corporation of Delaware Application September 16, 1932, Serial No. 633,482

3 Claims. (Cl. 23—174)

This invention relates to a method of treating heavy metal sulphates to convert the same to sulphur dioxide gas and an oxide of the metal; and has special reference to a method of treating steel mill pickle liquor (also known as pickling or ferrous sulphate solution) or the hydrate salt or crystals thereof such as "copperas."

The prime object of our present invention centers about the provision of a simple and economically managed process for reclaiming the otherwise waste constituents of ferrous sulphate ($FeSO_4.7H_2O$) and for converting the same into sulphur dioxide gas ($SO_2$) suitable for the economical production of sulphuric acid and into an iron oxide suitable for further use in the industries, as for example in blast furnaces and iron and steel reproducers.

Several methods have heretofore been suggested for treating pickle liquor or ferrous sulphate and reclaiming the constituents thereof which consist generally in first drying or dehydrating the ferrous sulphate solution or heptahydrate crystals to the mono-hydrous or to even the basic sulphate state and in then roasting the dried or dehydrated sulphate. In these suggested methods the main object sought to be accomplished was the recovery of the metal in the form of ferric oxide. The roasting step, carried out in calcination furnaces, was in effect an oxidation roasting step, the gases produced consisting of equal molecular quantities of sulphur dioxide ($SO_2$) and sulphur trioxide ($SO_3$). The difficulties involved in separating the sulphurous and sulphuric gases thus produced led to suggestions of special methods of dehydrating and roasting the sulphate wherein it was sought to produce $SO_3$ gas free from $SO_2$ gas; but so far as we are aware, none of these general or special methods for recovering the $SO_3$ and $SO_2$ gases has met with commercial acceptance or success.

In the copending application of Ingenuin Hechenbleikner, Serial No. 198,903, now abandoned, there is described a method of converting pickle liquor into sulphur dioxide gas and iron oxide. In this method the pickle liquor is first evaporated to an iron oxide powder having a low aqueous content such as one molecule of water of crystallization or less; and this powdered sulphate is then roasted with a comminuted or powdered reducing agent such as coal. The roasting step of this method is also set forth and claimed in the divisional application of Ingenuin Hechenbleikner, Serial No. 608,900, now Patent No. 2,006,693, dated July 2, 1935.

The present invention is based on our discovery that a mixture of dried ferrous sulphate and a carbonaceous reducing agent can be roasted in a rotary kiln in the presence of hot products of combustion containing free oxygen to produce an iron oxide cinder and a strong sulphur dioxide gas free from sulphur trioxide and suitable for conversion to sulphuric acid by the contact process.

We have discovered that the mixture of the sulphate and the reducing agent may be roasted in a single continuous operation to yield the desired sulphur dioxide and metal oxide end products. We have further found that this mixture may be very efficiently treated in one continuous operation by roasting the same in a rotary kiln. We have further found that the rate of reaction in the kiln may be controlled with facility, as by governing the depth of the bed of the mixture in the kiln, the speed of movement of the mixture through the kiln and the reaction heat or temperatures in the kiln to produce an $SO_3$-free $SO_2$ gas which may be readily converted by simple processing to sulphuric acid by the contact process and an iron oxide having a very low sulphur content, as for example below 1% and as low as 0.1%, the metal oxide being in a condition to permit the same to be returned to the blast furnace without need for further processing. The provision of an improved roasting method for accomplishing these results is the ultimate and prime object of our present invention.

To the accomplishment thereof and such other objects as will hereinafter appear, our invention consists in the method and the steps of the method as hereinafter more particularly described and sought to be defined in the claims, reference being had to the accompanying drawing which shows an apparatus which may be used in the practice of the method, and in which:

The figure is a diagrammatic view of apparatus for effecting both the dehydration and roasting steps of the complete process.

The roasting operation is preferably practiced in a rotary kiln A, into one end of which the sulphate-reducing agent mixture is charged by means of a screw conveyor feed 1, and from the other end of which the solid residue of the treatment (the oxide of the metal) is discharged through the hopper 2. The rotary kiln is designed to carry a substantially deep bed of the mixture $m$ under treatment, as shown in the drawing. The roasting operation is subdivided generally into two stages forming in sequence one continuous operation; and this subdivision may, we have found, be efficiently accomplished by subdividing the rotary kiln into a number of compartments by means of the annular partitions 3, 3, four compartments being preferred, as shown in the drawing, although a lesser or greater number may be provided.

The end products obtained in treating a mixture of dehydrated pickle liquor (or copperas crystals) and carbonaceous material consist, as aforesaid, of $SO_2$ gas free from $SO_3$ gas and an iron oxide of very low sulphur content which may be granulated or sintered in the process. The $SO_2$ gas produced, having a strength of from 8 to 11%, flows from the kiln through an exit flue 4, separator 5 and into a pipe 6, and thence directly to the condenser apparatus of a sulphuric acid producing system such as set forth in the Patent of Ingenuin Hechenbleikner, No. 2,038,429 dated April 21, 1936, or No. 2,000,444 dated May 7, 1935. The sintered iron oxide discharged from the kiln may be conveyed therefrom to a storage hopper 7. The roasting mixture m continuously feeds through the kiln, the iron oxide product is continuously discharged therefrom, and the $SO_2$ gas is continuously withdrawn from the kiln.

In the roasting process, considerable additional heat is required to decompose the ferrous sulphate and to granulate and clean up the finished product before it is discharged from the kiln, and this heat may be supplied by a combustion furnace B associated with the kiln A, the combustion furnace being provided with an exit flue 8 which opens directly into the mouth of the kiln so that the combustion gases may pass directly into the final end chamber of the kiln. The heat supplied by the furnace B affords ample opportunity to adjust the temperatures in the kiln required to clean up the iron oxide as well as to granulate it to whatever degree may be necessary, and at the same time to regulate the excess oxygen in the combustion gases in order too meet the reaction requirements in the kiln. Any desirable fuel may be employed for the furnace B, the use of pulverized coal fed through the pipe line 9 being indicated in the drawing.

The reactions taking place in the kiln require a substantial amount of time for completion, the rate of reaction being generally low. It is therefore desirable to maintain a substantially deep bed of the roasting mixture in the kiln, this being controlled by the height of the partition walls 3 and the end walls of the kiln, and to suitably govern the speed of movement of the mixture through the kiln. By controlling these factors, the required time for the reactions may be had and at the same time a substantial output may be obtained. The mechanical condition of the iron oxide product is also controlled by the rate of feed of the roasting mixture through the kiln and by the kiln temperatures. The heat regulates the sintering or nodulizing of the product rather than its sulphur content, the sulphur content being apparently dependent upon the time of reaction.

For the roasting step of the process the pickle liquor or sulphate salt and the comminuted carbonaceous material may be intimately mixed together in any desired way. We have discovered, however, that the roasting step may be practiced in a very efficient way by adding a substantial amount of the carbonaceous material directly to the pickle liquor (or salt) prior to dehydration thereof, and by then evaporating the mass or mixture to dryness, the dehydrated mixture being thereafter mixed, if desired, with a further amount of carbonaceous material also preferably in a fine state of division to produce a final mix which is fed to the roasting kiln. We prefer, therefore, to mix the ferrous sulphate either in the form of the solution or the salt with the pulverized carbonaceous material (coke or coal), and preferably with a substantial part thereof, the mix being obtained most simply by adding the carbonaceous material to the ferrous sulphate prior to dehydrating the same. The ferrous sulphate-coal mixture obtained is evaporated to a condition approximating complete dryness and preferably to a powder containing moisture equivalent to one molecule of water per molecule of iron sulphate or less, and most preferably to a powder product between the monohydrous and the anhydrous or basic salt. This evaporation may be carried out in various ways, as by direct heat in a rotary kiln, indirect evaporation in enclosed vessels, vacuum concentration, etc., evaporation in a rotary kiln being preferred, principally because of the advantage that this can be carried through from beginning to end in one continuous operation under suitable and maintained temperature control which may be made to synchronize with the continuous operation of the roasting kiln. The dehydration is desirably carried out at temperatures below the temperature of decomposition of the sulphate in the mixture to $SO_2$ and below the temperature that would cause any combustion of the carbonaceous material.

In the complete process we have found it desirable to use the carbonaceous material in a proportion in excess of that required to produce the reactions in the roasting step of the process. We have found that the roasting treatment of the sulphate is best carried out and maintained in the presence of an excess of the reducing agent, this excess being further desired to supply part of the reaction heat and to complete the reactions taking place in the roasting treatment. To effectuate these results the pulverized coke or coal is added to the pickle liquor or salt in the proportions of about 5% of the same to about 95% of the hepta-hydrate sulphate solution or crystals. After dehydration an additional amount of pulverized carbonaceous material may be added; and if added, is preferably in such amounts that the mix treated in the roasting step contains carbonaceous material of from 7 to 10% of the dehydrated mix.

Referring now again to the drawing, the dehydrator preferably comprises a rotary kiln A' also preferably subdivided by means of orificed partitions such as 10, 10 into separate and communicating compartments, into one end of which is fed through the pipe 11 the mass or mix to be dehydrated, and from the other end of which is led through the hopper and exit pipe 12 the dehydrated mix, which latter may be carried by the conveyor 13 to a hopper 14 feeding into the screw conveyor I of the roasting apparatus.

The heat for effecting dehydration is preferably provided by combustion gases generated in a furnace B' having its exit flue 15 opening directly into the mouth 16 of the rotary kiln or retort A', the combustion gases being thus made to flow directly in contact with the mass or mix in the retort A', as shown by the arrows, and counter-current to the movement of the sulphate and carbonaceous mix in the kiln. With the furnace is associated the usual blower 17; and while any desirable fuel may be employed, it is preferred to use part of the coke or coal which is pulverized for use in the other steps of the process, such coal being injected into the furnace through the nozzle 18.

The ferrous sulphate may be fed into the feed pipe 11 of the dehydrator A' from a tank or container 19, and as aforesaid the ferrous sulphate may be either in the form of the solution or the hepta-hydrate crystals. When the solid crystals are employed, the salt melts in its own water of crystallization as soon as heated in the first compartment of the kiln. If a weak sulphate solution is employed, it is preferable to subdivide the dehydrator kiln into three compartments so that a concentration of the solution with evaporation of water occurs in the first compartment; otherwise the dehydrator kiln is desirably subdivided into two compartments.

The carbonaceous material is admixed with the ferrous sulphate by simply adding the same to the liquor or salt feeding into the kiln. This carbonaceous material (coal or coke) may be fed from a coal pulverizer C through a pipe 20 and into a separator 21 which communicates with the feed pipe 11. Part of the pulverized coal may be diverted into the furnace nozzle 18 by means of the by-pass pipe 22. The water of evaporation and the combustion gases are expelled from the dehydrator and have exit through the stack 23. The compartments of the dehydrator kiln are preferably provided with rails or rods (not shown) which are elevated by the rotation of the kiln and which drop onto the sulphate and carbon mass in the kiln, these rods or rails functioning to assist in producing a powdered product and a very intimate mixture of the powdered coal and dehydrated powdered sulphate, a further function thereof being to prevent the caking or sticking of the mass on the walls of the retort and to facilitate the free flow of the mass or mix through the retort. The dehydrator kiln A' may be unlined, whereas the roasting kiln A is preferably lined with fire brick.

The following examples of the use of the complete process will serve to illustrate the preferred manner of practicing the same.

The each 100 pounds of $FeSO_4.7H_2O$ is added 5 pounds of coal or coke dust, and this feed mixture is dehydrated in the kiln A'. This drying is carried on to produce a dehydrated product of $FeSO_4.1H_2O$ or less, and preferably a product between the mono-hydrous and the anhydrous or basic salt. The temperature in the kiln A' is not allowed to rise sufficiently to cause any combustion of the coke dust or decomposition of the sulphate in the mix to $SO_2$. The temperatures may vary within substantial limits and may be, for example, for the type of apparatus described, from 450° to 600° F. The mono-hydrate decomposes first at a temperature above 480° F., so that temperatures higher than this are desirable. It is believed that the presence of the carbonaceous material in the mix obviates or minimizes the decomposition of the iron sulphate that would otherwise take place at the higher temperatures. The dehydrated mixture will contain about 5% water or moisture. To each 100 pounds of this dehydrated mixture containing 5% moisture may then be added 1 to 3 pounds of coal dust, the coal dust being added preferably at the top of the hopper 14. With this addition the composition of the mixture fed to the roasting kiln is substantially as follows: 84.4% iron sulphate, 5% water, 7.8% coke dust and 2.8% coal dust.

As another example, to each 100 pounds of feed $FeSO_4.7H_2O$ is added about 5 pounds of coal dust and this feed mixture is then dried in the kiln. The same temperatures as given in the first example may be used to produce a salt close to the anhydrous state. Prior to roasting no additional carbonaceous material need be added so that the composition of the mixture fed to the roasting kiln is substantially as follows: 88 to 89% $FeSO_4$, 6 to 7% carbon and 5% moisture.

It is also found desirable to add a small amount of sulphur bearing ore to the roasting mixture to give additional $SO_2$, and in this way duplicate commercial requirements which would involve the production of "make-up" acid simultaneously with the recovery of acid from pickling solution; and in the examples given this desideratum may be carried out by adding 8 pounds of pyrrhotite (containing approximately 35% S) to every 100 pounds of the charge entering the roasting kiln.

With a roasting kiln A of about 12 feet long and 3 feet diameter, the roasting mixture of either example given may be fed through the kiln at the rate of from 200 to 250 pounds per hour; and the exit gas temperatures may be from 450° F. to 550° F. (which range of temperatures for larger kilns may be substantially exceeded). The temperature at which the granulated product may leave the kiln may be around 1100 to 1200° F. and the excess oxygen in the kiln gases may be from 2 to 5%. The $SO_2$ gas produced will be of high concentration, as from 8 to 11%, and the iron oxide will have a very low sulphur content, as for example much less than 1%, and even as low as 0.1%. It is found from the carbon analysis of the iron cinder produced in the first example given that about 4.1 pounds per 84.4 pounds $FeSO_4$, and therefore 4.8% of the carbon, is consumed in the process, this carbon consumption being both for the reduction and heat combustion taking place in the complete process.

The manner of practicing the complete process of our present invention and the advantages thereof will in the main be fully apparent from the above detailed description thereof. The dehydration step is carried out in a single operation and produces at once an evaporation to the highest degree of dryness of the aqueous salt and a very intimate mixture thereof with the reducing agent. We have found that the finer the powdered carbonaceous material used, the more intimate the mixture and the better the result obtained in the roasting step. In the roasting step the effective decomposition of the sulphate to oxides of iron and sulphur dioxide and the finishing and granulating of the iron oxide, are all accomplished sequentially and in one continuous operation under simple manipulation and control of the operator. The obtaining of an $SO_2$ gas as good as completely free from $SO_3$ is an advantage of the utmost importance. The extent to which the $SO_2$ gas obtained is free from $SO_3$ will be appreciated when it is understood that the produced $SO_2$ gas after being passed through water is clear of any mist when looking through the gas even in a depth of 15 feet. This means that the content of $SO_3$, if any there be present, is down to wholly negligible amounts. The importance of obtaining an $SO_3$-free $SO_2$ gas, which moreover is of the high strength mentioned, will also be seen when it is appreciated that this gas can be utilized and is utilized in accordance with our invention directly for making contact acid without the expensive equipment for purification and mist removal ordinarily used in contact plants, it being thus now possible to build a complete plant to make contact sulphuric acid at a cost very considerably lower than that heretofore possible with other methods. The obtaining of the substantially completely desulphurized iron oxide by means of the method is also a corrollary advantage of the highest importance.

The process of our invention, while described for ferrous sulphate, is equally applicable to the treatment of zinc sulphate, copper sulphate and the general class of heavy metal oxidized sulphur compounds. While the orificed partitions in the kiln are not theoretically necessary to accomplish the sequential reactions, it has been found that they are useful to retard the passage of the mixture and control the feed of movement thereof through the kiln and to insure the thorough mixing and homogeneous reactions in the kiln. While we have specified in the examples given the treatment of ferrous sulphate solution or the hepta-hydrate salt, it will be understood that hydrate salts of lower aqueous content than hepta-hydrate may also be employed in the process. It will be further appreciated that the dehydration in the drying kiln may be carried on as far as desired and even to the anhydrous state of the salt, the temperatures being varied accordingly. While various temperatures and proportions of ingredients have been specified in the examples given, it will be further understood that these may be varied within substantial limits; for example, the excess carbonaceous content of the mix may be varied depending how far the reduction or roasting step of the complete process is desired to be carried out. The temperature of the roasting may also be controlled by a re-circulation through the kiln of some or all of either the $SO_2$ gas produced or the finished iron oxide, re-circulation of the gas being preferred to re-circulation of the oxide so as to prevent too high temperatures.

While we have described the process and apparatus to be used therefor showing the practice of the steps in the preferred manner, it will thus be obvious that we may make many changes and modifications therein without departing from the spirit of the invention as defined in the following claims.

We claim:

1. The method of roasting ferrous sulphate and obtaining therefrom sulphuric acid and iron oxide which comprises introducing into a rotary kiln a mixture containing the sulphate in dehydrated condition and 6 to 10% of carbon in the form of carbonaceous material, passing the mixture through the kiln in countercurrent contact with a stream of combustion gases containing free oxygen at temperatures sufficiently high to cause decomposition of ferrous sulphate and desulphurization of the material, and passing the mixture of sulphur dioxide and products of combustion so obtained to a contact sulphuric acid process.

2. In a process of roasting ferrous sulphate and producing therefrom iron oxide and a gas containing sulphur dioxide and carbon dioxide, which gas is suitable for the manufacture of sulphuric acid by the contact process, the steps which comprise continuously introducing into a rotary kiln a mixture containing dried ferrous sulphate together with carbon in the form of a carbonaceous material in amounts sufficient to decompose the ferrous sulphate and liberate its sulphur content as sulphur dioxide in the presence of hot gases, continuously passing the mixture through the kiln during rotation thereof in countercurrent contact with hot products of combustion containing free oxygen, maintaining the rate of feed and the speed of rotation of the kiln at such a value that the ferrous sulphate is decomposed in the earlier portions of the kiln and substantially completely converted to iron oxide and sulphur dioxide in the later portions thereof, and withdrawing the iron oxide and the sulphur dioxide gases from the kiln in separate streams.

3. In a process of roasting ferrous sulphate and producing therefrom an iron oxide product and a gas containing sulphur dioxide and carbon dioxide, which gas is suitable for the manufacture of sulphuric acid by the contact process, the steps which comprise continuously introducing into a rotary kiln a mixture containing dried ferrous sulphate together with an amount of carbon such that free carbon in substantial amounts appears in the iron oxide product, continuously passing the mixture through the kiln during rotation thereof in countercurrent contact with hot products of combustion containing free oxygen, continuously maintaining within the kiln temperatures such that the exit gas temperature is at least 450° F. and the maximum temperature of the solid product is at least 1100° F., and continuously withdrawing the iron oxide product and the sulphur dioxide gases from the kiln in separate streams.

INGENUIN HECHENBLEIKNER.
NICOLAY TITLESTAD.